April 17, 1962     G. A. SCHERRY     3,030,131
FASTENER CONSTRUCTION
Filed May 23, 1958
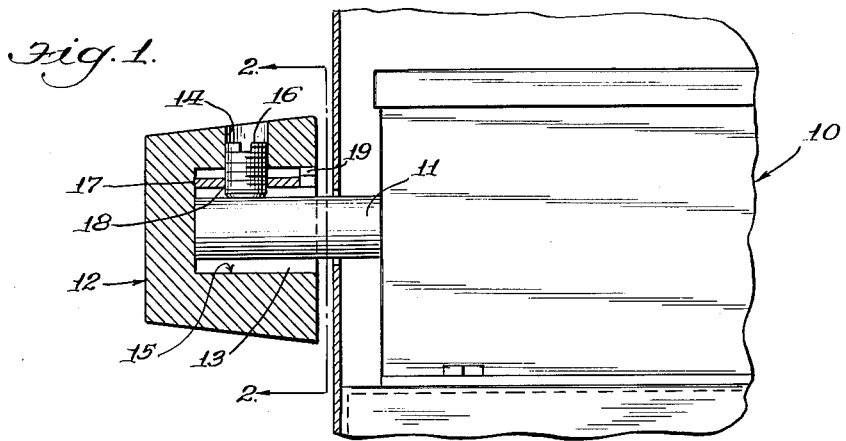
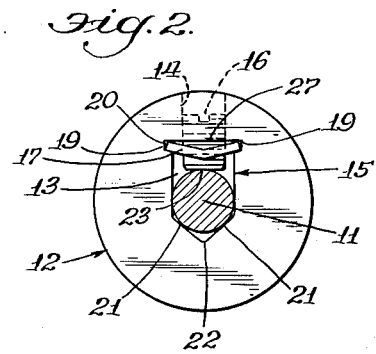
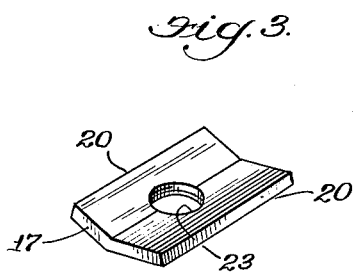
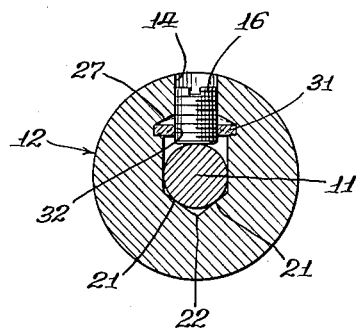
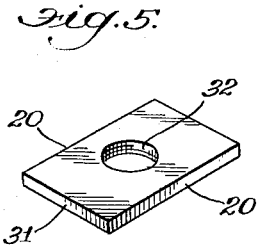
INVENTOR.
George A. Scherry
BY Mueller · Aichele
Attys.

United States Patent Office 3,030,131
Patented Apr. 17, 1962

3,030,131
FASTENER CONSTRUCTION
George A. Scherry, Berkeley, Ill., assignor to Grayhill, Inc., La Grange, Ill., a corporation of Illinois
Filed May 23, 1958, Ser. No. 737,261
2 Claims. (Cl. 287—53)

This invention relates generally to fasteners, and more particularly to the provision of a knob or like member having a new and improved fastening and locking construction for rigidly securing the same to a cylindrical shaft.

Many commercial and industrial articles are provided with cylindrical shafts having knobs, pulleys, gears and various other members secured thereto. Various types of fastener constructions have been used to secure such members in place. One common type involves the provision of a member having one aperture bounded by a seating surface which is adapted to bear against the shaft, and having another aperture leading to the exterior of the member for receiving a set screw. A nut may be mounted in the latter aperture so that when the set screw is tightened, it exerts a force having a component which acts normal to the seating surface and holds the member in place. A common difficulty with such fastening provisions is that with usage the knob or other member tends to wobble with respect to the shaft. The wobble may initially be very slight, but may gradually get worse until the knob eventually works loose. The loosening process may be hastened if the knob is not firmly seated and the set screw is not securely locked in place.

Accordingly, it is an object of this invention to provide a new and improved fastener construction for rigidly mounting a member on a cylindrical shaft.

Another object is to provide a fastener construction for a shaft-mounted member having a spring biased member for holding a set screw against the shaft and for locking the set screw against rotation.

Still another object of the invention is to provide an improved lock nut and set screw construction for a shaft-mounted member for maintaining a rigid seat between the member and the shaft.

A still further object of the invention is to provide a wobble reducing fastener construction for a shaft-mounted knob which requires only a single set screw, thereby reducing manufacturing costs.

A feature of the invention is the provision of a shaft-mounted member having at least two seating surfaces, and a set screw bearing against the shaft at one point and drawing the seating surfaces against the shaft along two lines of engagement, thereby providing three point contact between the shaft and the member to prevent relative wobbling movement therebetween.

A further feature of the invention is the provision of a fastener construction for a shaft-mounted member as described in the preceding paragraph with a spring plate mounted in an opening in the member and having a threaded opening for receiving the set screw and providing spring tension thereon, and for locking it firmly in place by thread interference action.

A still further feature of the invention is the provision of an improved set screw fastener construction including a spring plate having a pre-formed V-shape cross-section to concentrate bending for providing effective thread interference to lock the set screw in place.

The invention is illustrated in the accompanying drawing in which:

FIG. 1 is a view partly in section of apparatus having a rotatable shaft with a knob fastened thereto in accordance with the invention;

FIG. 2 is a cross-sectional view showing the fastener construction forming one embodiment of the invention;

FIG. 3 is a detail view showing a spring plate used in the fastener of FIG. 2;

FIG. 4 is a cross-sectional view of a fastener construction forming another embodiment of the invention; and FIG. 5 is a detail view of a spring plate used in the fastener construction of FIG. 4.

The invention provides an inexpensive fastener construction for rigidly securing a member such as a knob to a shaft by spring tensioned three point seating contact and improved locking action. In practicing the invention, a knob or like member which is to be secured to the shaft is provided with a cavity for receiving the shaft and an aperture for receiving a set screw perpendicular to the shaft. A pair of seating surfaces are provided opposite the aperture in the wall bounding the cavity. These seating surfaces may be angularly disposed and preferably form a V so that the shaft will bear thereagainst tangentially along two angularly disposed lines of engagement. The wall bounding the cavity may be provided with small recesses, and the outer edge of a spring plate having a central threaded opening is seated in these recesses in position to co-act with the set screw. The set screw may be tightened until its end bears against the shaft at a point opposite the V formed by the seating surfaces. Then when the set screw is tightened further, the spring bends slightly so that tension is applied to the set screw and the threads on the spring interfere with those of the set screw to lock it in place. The spring plate may also be provided with a V-shape so that its bending action is concentrated at the point of the V in order to provide more effective locking action. The three point seat provided by this arrangement substantially eliminates any tendency of the knob to wobble with respect to the shaft, and since the set screw is spring biased and tightly locked, the rigidity of the fastening is maintained throughout the useful life of the equipment.

In FIG. 1 there is shown apparatus 10 which represents equipment having a rotatable control shaft 11. The shaft extends into a cavity 13 provided in the knob 12. Although a knob is illustrated, it is apparent that the invention may be used to fasten other shaft-mounted members such as pulleys, gears and the like. The fastener construction is particularly suited for use with cylindrical shafts, but the shaft may have a flatted portion or some other shape. An aperture 14 is provided in the member 12 to receive a set screw 16 whose rotational axis is perpendicular to that of the shaft 11. A spring plate 17 mounted in the cavity 13 has an opening whose edge 18 has threads engaging those of the set screw 16. Recesses 19 may be provided on opposite sides of the wall 15 bounding the cavity 13, and opposite edges 20 of the spring plate 17 are seated in these recesses.

As may be seen more clearly in FIGS. 2 and 4, the wall 15 is provided with a pair of seating surfaces 21 which are angularly disposed with respect to each other. The surfaces 21 preferably form a V whose point 22 is aligned with the axis of the aperture 14. The rotational axis of the set screw 16 preferably points toward the intersection 22 of surfaces 21 and may bisect the angle between them. Thus, the set screw engages the shaft at a point 23 opposite the point of the V, and the surfaces 21 engage it tangentially along two angularly spaced lines to provide a three point seat for the shaft which substantially eliminates wobbling. Surfaces 21 are preferably flat, but could be curved or otherwise altered so long as the spaced lines of engagement are provided.

As shown in FIGS. 2 and 3, the spring plate may have a V-shape. The plate is given this shape before the threads 23 are tapped. The set screw may be a standard size 8 with 32 threads per inch, and, of course, the threads 23 are matching. The thread size given is intended to be merely illustrative. The plate is a very thin strip of spring metal preferably having a thickness of 1/32 of an inch or less, and is preferably made of phosphor bronze. Of course, the thickness would have to be increased if the member to be fastened is large, but the thickness of the plate as compared to its other dimensions is very small. The V of the spring plate points towards the intersection 22 of the seating surfaces.

As the set screw 16 is turned, the plate 17 draws it into engagement with the shaft 11. Then when the set screw is turned further, it tends to flatten the plate 17 against surface 27 of wall 15. The spring action of the plate applies a resilient pressure to the set screw so that it firmly engages the shaft 11. Since the spring plate 17 is thin, and since bending is concentrated at the point of the V, the pitch of the thread as originally tapped becomes sufficiently distorted as to provide thread interference which gives effective locking action so that the set screw will not turn in the plate and loosen itself.

In FIGS. 4 and 5 there is shown another embodiment of the invention. The fastening provisions are in most ways the same as in FIGS. 2 and 3, so only the differences will be described in detail. The spring plate 31 is substantially flat, and therefore the surface 27 is given a V-shape to provide room for the plate to bend. The locking action provided by the spring plate 31 is similar to that previously described. The plate 31 is very thin, as is plate 17, and the aperture therein tends to concentrate bending somewhat, so that there is substantial distortion of the threads. The embodiment of FIGS. 4 and 5 therefore provides satisfactory results.

It is apparent from the foregoing description that the invention provides a rigid fastener construction which is simple and yet very effective. The knob may be of molded plastic so that the various seating surfaces therein may be provided inexpensively, and no molded inserts which would increase cost need be added. The fastener requires only a single set screw and spring combination, and still provides a three point seat having two lines of engagement for a shaft. Furthermore, the tensioning and locking action provided by the spring plate is thought to be an improvement over that of known structures.

I claim:

1. A fastener construction for use with a curved shaft including in combination, a knob member having a cavity therein for receiving the shaft, said members having a portion with a pair of adjacent substantially flat surfaces partially bounding said cavity for seating the shaft, said surfaces being angularly disposed with respect to each other to form a V and said surfaces engaging the shaft along two spaced lines, said member having an aperture extending between the exterior thereof and said cavity, said aperture opening into said cavity at a point substantially opposite said surfaces, a threaded set screw for insertion in said aperture with the rotational axis thereof substantially bisecting the V formed by said surfaces, and a resiliently bendable spring plate mounted in said member in a fixed position adjacent said aperture, said spring plate normally having a V-shape with the point thereof being directed toward the point of the V formed by said flat surfaces, said knob member having a third substantially flat surface partly bounding said cavity and located about said aperture, said spring plate engaging said third surface with the point of the V thereof directed away from said flat surface, said spring plate having a threaded central opening at the point of the V thereof, said set screw being threaded in said central opening of said spring plate so that said set screw can be drawn into contact with the shaft at a point spaced circumferentially from said lines of engagement, and said spring plate being bent substantially flat against said third surface and applying pressure to said set screw to hold the same against the shaft when said set screw is tightened after contacting the shaft, the bending of said plate being substantially concentrated along the point of the V thereof whereby each thread in said plate is bent to provide effective thread interference between said plate and said set screw to hold said set screw against rotation, and the bending of said plate further providing spring tension for locking said member on the shaft to prevent wobbling movement between said member and the shaft.

2. A fastener construction for use with a curved shaft including in combination, a molded plastic knob having a cavity therein for receiving the shaft, said cavity being bounded by a molded wall having a pair of substantially flat surfaces, said surfaces being angularly disposed with respect to each other to form a V and adapted to contact the shaft tangentially at first and second spaced lines, said knob having an aperture extending between the exterior thereof and said cavity, said aperture opening into said cavity at a point substantially opposite said V formed by said flat surfaces, said wall having a third surface located opposite said pair of surfaces and about said cavity opening of said aperture and having recessed portions adjacent said third surface, a resiliently bendable spring plate having a thickness of 1/32 of an inch or less with edge portions seated in said recessed portions and being held in a substantially fixed position thereby, said spring plate having a V-shape cross section with the point thereof directed toward the point of the V formed by said flat surfaces whereby portions of said spring plate are angularly disposed with respect to said third surface forming a generally triangular space which permits substantial bending of said spring plate towards said third surface, said spring plate having a central threaded aperture, a threaded set screw in said central aperture and adapted to be drawn into contact with the shaft at a third point spaced circumferentially of the shaft from said first and second lines, thereby providing engagement with the shaft to prevent said knob from wobbling with respect thereto, said spring plate being bent along the point of the V thereof and applying pressure to said set screw to hold the same against the shaft when said set screw is tightened after contacting the shaft, said threaded aperture of said spring plate having threads whose pitch is distorted substantially upon such bending to interfere with the threads of said set screw, thereby effectively locking said set screw in place and maintaining the same in resilient engagement with the shaft.

References Cited in the file of this patent

UNITED STATES PATENTS

| | | |
|---|---|---|
| 307,570 | Morgan | Nov. 4, 1884 |
| 1,309,675 | Young et al. | July 15, 1919 |
| 1,537,227 | DeWitt | May 12, 1925 |
| 1,800,055 | DeTar | Apr. 7, 1931 |
| 1,998,649 | Arden | Apr. 23, 1935 |
| 2,197,140 | Arvin | Apr. 16, 1940 |
| 2,241,724 | Kamenarovic | May 13, 1941 |
| 2,305,099 | Morris | Dec. 15, 1942 |
| 2,855,013 | Lillard | Oct. 7, 1958 |

FOREIGN PATENTS

| | | |
|---|---|---|
| 706,620 | Great Britain | Mar. 31, 1954 |
| 315,014 | Great Britain | July 4, 1929 |